(12) United States Patent
Gibson

(10) Patent No.: US 7,596,507 B2
(45) Date of Patent: Sep. 29, 2009

(54) METHODS, SYSTEMS, AND STORAGE MEDIUMS FOR MANAGING ACCELERATED PERFORMANCE

(75) Inventor: Paula Webb Gibson, Alpharetta, GA (US)

(73) Assignee: AT&T Intellectual Property, I,L.P., Wilmington, DE (US)

( * ) Notice: Subject to any disclaimer, the term of this patent is extended or adjusted under 35 U.S.C. 154(b) by 329 days.

(21) Appl. No.: 11/322,770

(22) Filed: Dec. 30, 2005

(65) Prior Publication Data
US 2006/0282305 A1 Dec. 14, 2006

Related U.S. Application Data

(60) Provisional application No. 60/689,781, filed on Jun. 10, 2005.

(51) Int. Cl.
*G06F 11/34* (2006.01)
(52) U.S. Cl. ........................................................ 705/11
(58) Field of Classification Search .................... 705/11
See application file for complete search history.

(56) References Cited

U.S. PATENT DOCUMENTS

| | | | | |
|---|---|---|---|---|
| 3,611,313 | A | * | 10/1971 | Moser et al. .................. 358/1.3 |
| 5,452,350 | A | * | 9/1995 | Reynolds et al. ........ 379/221.07 |
| 5,557,553 | A | * | 9/1996 | Sellie, Sr. .................... 702/176 |
| 5,726,914 | A | | 3/1998 | Janovski et al. |
| 5,987,443 | A | | 11/1999 | Nichols et al. |
| 6,119,097 | A | | 9/2000 | Ibarra |
| 6,324,282 | B1 | | 11/2001 | McIllwaine et al. |
| 6,438,353 | B1 | | 8/2002 | Casey-Cholakis et al. |
| 6,603,854 | B1 | * | 8/2003 | Judkins et al. ......... 379/265.06 |
| 6,606,480 | B1 | | 8/2003 | L'Allier et al. |
| 6,735,570 | B1 | | 5/2004 | Lacy et al. |
| 6,741,697 | B2 | * | 5/2004 | Benson et al. ......... 379/265.02 |

(Continued)

FOREIGN PATENT DOCUMENTS

EP 1011256 A2 * 6/2000

(Continued)

OTHER PUBLICATIONS

Horney, Bryan, Implementing a Management Control System Retail Control, vol. 52, No. 7, Mar. 1994, Abstract.*

(Continued)

*Primary Examiner*—Scott L Jarrett
(74) *Attorney, Agent, or Firm*—Cantor Colburn LLP

(57) ABSTRACT

Exemplary embodiments relate to methods, systems, and storage mediums for providing a disciplined approach to managing accelerated performance activities. The method includes identifying an opportunity; developing an activity list of at least one of a task and a behavior that relate to the identified opportunity; performing a time study associated with the task and the behaviors; collecting a time study data resulting from the time study; collecting a performance data resulting from an actual performance of work activities, wherein the performance data includes a quality indicator; creating a scorecard for analyzing the correlation between the time study data and the performance data; identifying a issue presented as a result of analyzing the time study data and the performance data; generating and implementing a roadmap for resolving the issue; and training a individual affected by the roadmap in accordance with an action item contained in the roadmap.

18 Claims, 11 Drawing Sheets

U.S. PATENT DOCUMENTS

| | | | |
|---|---|---|---|
| 6,754,874 B1 | 6/2004 | Richman | |
| 6,760,727 B1 * | 7/2004 | Schroeder et al. | 707/10 |
| 6,807,535 B2 | 10/2004 | Goodkovsky | |
| 6,847,711 B2 * | 1/2005 | Knott et al. | 379/265.06 |
| 6,859,523 B1 | 2/2005 | Jilk et al. | |
| 6,944,596 B1 | 9/2005 | Gray et al. | |
| 6,944,624 B2 | 9/2005 | Orton et al. | |
| 7,035,809 B2 * | 4/2006 | Miller et al. | 705/8 |
| 7,092,821 B2 | 8/2006 | Mizrahi et al. | |
| 7,149,700 B1 * | 12/2006 | Munoz et al. | 705/8 |
| 7,153,140 B2 | 12/2006 | Ivanir et al. | |
| 7,367,808 B1 | 5/2008 | Frank et al. | |
| 7,483,842 B1 | 1/2009 | Fung et al. | |
| 2001/0008999 A1 | 7/2001 | Bull | |
| 2001/0039002 A1 | 11/2001 | Delehanty | |
| 2002/0198765 A1 | 12/2002 | Magrino et al. | |
| 2003/0101091 A1 | 5/2003 | Levin et al. | |
| 2003/0129575 A1 | 7/2003 | L'Allier et al. | |
| 2003/0182178 A1 | 9/2003 | D'Elena et al. | |
| 2003/0229529 A1 | 12/2003 | Mui et al. | |
| 2004/0009462 A1 | 1/2004 | McElwrath | |
| 2004/0014016 A1 | 1/2004 | Popeck et al. | |
| 2004/0029093 A1 | 2/2004 | Guignard | |
| 2004/0068431 A1 * | 4/2004 | Smith et al. | 705/10 |
| 2004/0102926 A1 * | 5/2004 | Adendorff et al. | 702/182 |
| 2005/0043976 A1 * | 2/2005 | Leehman | 705/7 |
| 2006/0123060 A1 | 6/2006 | Allen et al. | |
| 2006/0240396 A1 | 10/2006 | Foo et al. | |
| 2007/0203711 A1 | 8/2007 | Nation et al. | |

FOREIGN PATENT DOCUMENTS

| | | | |
|---|---|---|---|
| GB | 2336066 A | * | 6/1999 |
| WO | 0125971 A1 | | 12/2001 |

OTHER PUBLICATIONS

Denton, Keith D., Work Sampling: Increasing Service and White Collar Productivity Management Solutions, vol. 32, No. 3, Mar. 1987.*

Michaels, Edwards A., Work Measurement Small Business Reports, vol. 14, No. 3, Mar. 1989.*

Wilde, Edwin, A performance control system Engineering Management Journal, Oct. 1993.*

Hall, Computer Work Measurement Systems Management Services, Feb. 1991, vol. 35, No. 2.*

Kaplan, Robert S. et al., Linking the Balanced Scorecard to Strategy California Management Review, vol. 39 No. 1, Fall 1996.*

Maskell, Brian H., Performance Measurement for World Class Manufacturing Productivity Press, 1991, ISBN: 0-915299-99-2.*

Kaydos, Will, Operational Performance Measurement CRC PRess, 1999, ISBN: 1-5744-099-3.*

Chang, Richard Y. et al., Performance Scorecards HB Printing, 2000, ISBN 0-7879-5272-9.*

Epstein, Marc et al., Implementing Corporate Strategy: From Tableaux de Bord to Balanced Scorecards European Management Journal, vol. 16, No. 2, 1998.*

Baines, Anna, Work measurement—The basic principles revisited Work Study, Sep./Oct. 1995, vol. 44, No. 7.* aplan, Robert S. et al., Linking the Balanced Scorecard to Strategy California Management Review, vol. 39 No. 1, Fall 1996.*

Syntora.com Web Pages (agentivity) Retreived from Syntora.com, Sep. 2, 2003.*

Russell, J.P., All about auditing Quality Progress, vol. 33, No. 4, May 2000.*

Skowronek, Larry, Aspect eWorkforce Management v6—New Features and Functionality Aspect, Jul. 30, 2001.*

Pape, Elinor, Automated Work Sampling with Unbiased Variance Estimates Computers & Industrial Engineering, vol. 6, No. 1, 1982.*

Brisley, Chester L. et al., Balancing Cost and Accuracy in Setting Up Standards for Work Measurement Industrial Engineering, vol. 14 No. 5, May 1982.*

Pels Mary Ann et al., Benchmakring Call Center Performance Credit Union Executive, vol. 39, No. 4, Jul./Aug. 1999.*

Perkins, Debra S. et al., Best Practices For Customer Service Call Centers—An Exclusive Statistical Study Telemarkering & Call Center Solutions, vol. 15, No. 10, Apr. 1997.*

Read, Brenda B., Call Center Checkup Call Center Magazine, vol. 16, No. 6, Jun. 2003.*

Alban, Oscar, Customer internation monitoring: your key to measure service performance Australian Banking & Finance, vol. 10, No. 6, Apr. 18, 2001.*

Van Bodegraven, Art, Developing and Using Standards for Work Performance Topics in Health Care Financing, vol. 15, No. 3, SPring 1989.*

Fluss, Donna, How QM Recording Is Changing For The Better Call Center Magazine, vol. 18, No. 2, Feb. 2005.*

Gagnon, Eugene J., How To Measure Work Material Handing Management, vol. 55, No. 2, Feb. 2000.*

Carlow, Malcom et al., Managing and Motivating Contact Center Employees McGrawHill, 2003, ISBN: 0-07-138888-5.*

Bishop, Fred W. et al., Measure for measure Electric Perspectives, vol. 27, No. 2, Mar./Apr. 2002.*

Stansfield, Timothy Charles, The effects of feedback and goal setting on manufacturing productivity improvement: A field experiment in manufacturing cells, The University of Toledo, 1997, AAT 9816873.*

Fitzpatrick, Michael J., Measuring Productivity With Employee Task Charts American Agent & Broker, Oct. 1988, vol. 60, No. 10.*

Sampson, Williara, Tracking and teamwork clock in at this shop CabinetMaker, vol. 14, No. 6, May 2000.*

Blau, Frank, How to track service calls Plumbing & Mechanical, vol. 17, No. 9, Nov. 2000.*

Gray, Clifford F., An Integrated Methodology for Dynamic Labor Productivity Standards, Performance Control, and System Audit In Warehouse Operations, Production and Inventory Management Journal, vol. 33, No. 3, 1992.*

Grant, Rebecca A., et al., Computerized Performance Monitors as Multidimensional Systems: Derivation and Application AMC Transactions on Information Systems, vol. 14, No. 2, Apr. 1996.

* cited by examiner

|  | ACTIVITY LIST SUMMARY | | STATE: GA<br>CENTER: AFIG<br>AREA: see below<br>DATE UPDATED: 5/2/2003 | | | | |
|---|---|---|---|---|---|---|---|
| ACT. # | ACTIVITY | UNIT OF MEASURE | DAILY FREQ | MONTHLY VOL | EST MINS | ESM/RE MINS | % TOTAL VOL |
|  | SO Processing Area |  |  |  |  |  |  |
| 1 | RMA Resolution | order |  |  |  |  |  |
| 2 | Reuse report | euse group |  |  |  |  |  |
| 3 | QA report | order |  |  |  |  |  |
| 4 | SOCS errors | error |  |  |  |  |  |
| 5 | Field assist calls | call |  |  |  |  |  |
| 6 | HAL report | order |  |  |  |  |  |
| 7 | PAWS pending order report | order |  |  |  |  |  |
|  | EWO Processing Area |  |  |  |  |  |  |
| 8 | Basic inventory updates | item |  |  |  |  |  |
| 18 | Delay/deficiency reports | report |  |  |  |  |  |
|  | Data Base Maintenance Area |  |  |  |  |  |  |
| 19 | DAVAR processing | report |  |  |  |  |  |
| 20 | Defective pair reports | item |  |  |  |  |  |
| 21 | E911 activities | item |  |  |  |  |  |
| 22 | RSAG activities | order/item |  |  |  |  |  |
| 23 | Miscellaneous data base update/correct | item |  |  |  |  |  |
| 24 | DIS fallout | item |  |  |  |  |  |
| 25 | LURI/RULI reports | item |  |  |  |  |  |
| 26 | Pending order/past due reports | order |  |  |  |  |  |
| 27 | LMOS updates | order |  |  |  |  |  |
| 28 | DAML removal | wait |  |  |  |  |  |
| 29 | TRAPPER center referrals | item |  |  |  |  |  |
| 30 | Projects/Conversions | item |  |  |  |  |  |
|  |  |  |  | 0 | TOTAL MONTHLY VOL | | |

Fig. 10

DAILY SCHEDULE CONTROL

Center: _____  Group: _____  Department: _____  Supervisor: _____  Date: 4/30/2003

| Craft Person | Daily Checks | | | | | | Daily O/U Total | Daily Demand Hrs | Daily Exception Hrs |
|---|---|---|---|---|---|---|---|---|---|
| | 8am | 10am | 12pm | 2pm | 4pm | 6pm | | | |
| | Over/Under (EH) | | | | | | | | |
| SMITH, PATRICIA R | (1.42) | (2.00) | (2.00) | (2.00) | (2.00) | (1.00) | (8.42) | (9.00) | (0.00) |
| Total Over/Under (EH) | (1.42) | (2.00) | (2.00) | (2.00) | (2.00) | (1.00) | (8.42) | (9.00) | (0.00) |

ACTION PLAN

DEPARTMENT: _____

GOAL: _____

BARRIER: _____

CHAMPION: _____

PARTICIPANTS: _____

DATE: _____
PAGE: _____

| ACTION PLAN STEPS $ | DATE DUE | WHO IS RESPONSIBLE ? | REVIEW DATES | | DATE COMP | POTENTIAL SAVINGS $ |
|---|---|---|---|---|---|---|
| | | | DATE | DATE | | |
| | | | | | | |
| | | | | | | |
| | | | | | | |

*Fig. 13*

METHODS, SYSTEMS, AND STORAGE MEDIUMS FOR MANAGING ACCELERATED PERFORMANCE

CROSS REFERENCE TO RELATED APPLICATIONS

This application claims the benefit of U.S. Provisional Patent Application Ser. No. 60/689,781 filed Jun. 10, 2005, which is incorporated herein by reference in its entirety.

BACKGROUND

The present invention relates generally to business models, and more particularly, the invention relates to methods, systems, and storage mediums for managing accelerated performance.

Supervisors and managers of business enterprises are typically trained on the job with little discipline provided concerning the various reporting requirements, behaviors that should be coached, and which metrics are important to the business. As new management comes along, to replace retired individuals or as a result of turnover, they often need to re-invent what their predecessors have learned over time through experiences. A great deal of relevant knowledge and experience may be lost as a result of a change in management. This can be very wasteful and result in diminished productivity.

What is needed, therefore, is a way to provide a disciplined approach to managing accelerated performance activities that can be systematically implemented across an entire managing accelerated performance environment.

SUMMARY

Exemplary embodiments include a method of providing a disciplined approach for conducting managing accelerated performance activities, the method including developing an activity list of at least one of a task and a behavior that relate to an identified opportunity; performing a time study associated with the task and the behaviors; collecting a time study data resulting from the time study; collecting a performance data resulting from an actual performance of work activities, wherein the performance data includes a quality indicator; creating a scorecard for analyzing the correlation between the time study data and the performance data; identifying a issue presented as a result of analyzing the time study data and the performance data; generating and implementing a roadmap for resolving the issue; and training a individual affected by the roadmap in accordance with an action item contained in the roadmap.

Exemplary embodiments also include a storage medium encoded with machine-readable computer program code for providing a disciplined approach for conducting managing accelerated performance activities, the storage medium including instructions for causing a server to implement a method, including: developing an activity list of at least one of a task and a behavior that relate to an identified opportunity; performing a time study associated with the task and the behaviors; collecting a time study data resulting from the time study; collecting a performance data resulting from an actual performance of work activities, wherein the performance data includes a quality indicator; creating a scorecard for analyzing the correlation between the time study data and the performance data; identifying a issue presented as a result of analyzing the time study data and the performance data; generating and implementing a roadmap for resolving the issue; and training a individual affected by the roadmap in accordance with an action item contained in the roadmap.

Further exemplary embodiments include a system for providing a disciplined approach for conducting managing accelerated performance activities, including: a server; a managing accelerated performance system executing on the server, the managing accelerated performance system including a managing accelerated performance system model including: a plan phase component; an execute phase component; a report phase component; a follow-up component; a coach/train component; a forecast component; and a sustain component; wherein the managing accelerated performance system performs: identifying an opportunity; developing an activity list of at least one of a task and a behavior that relate to the identified opportunity; performing a time study associated with the task and the behaviors; collecting a time study data resulting from the time study; collecting a performance data resulting from an actual performance of work activities, wherein the performance data includes a quality indicator; creating a scorecard for analyzing the correlation between the time study data and the performance data; identifying a issue presented as a result of analyzing the time study data and the performance data; generating and implementing a roadmap for resolving the issue; and training a individual affected by the roadmap in accordance with an action item contained in the roadmap.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

Referring now to the drawings wherein like elements are numbered alike in the several Figures:

FIG. 10 is a sample activity list summary that is utilized by the managing accelerated performance system model in exemplary embodiments;

FIG. 11 is a sample daily schedule control form that is utilized by the managing accelerated performance system model in exemplary embodiments;

FIG. 12 is a sample scorecard that is utilized by the managing accelerated performance system model in exemplary embodiments; and FIG. 13 is a sample action plan that is utilized by the managing accelerated performance system model in exemplary embodiments.

DETAILED DESCRIPTION

According to an exemplary embodiment, a managing accelerated performance system provides a disciplined approach to transfer knowledge from one individual or group to another individual or group. The managing accelerated performance system further provides a framework for new employees to learn a job based, in part, upon a knowledge database implemented by the managing accelerated performance system. The managing accelerated performance system combines selected business processes into a single business model. The business processes include process management, work measurement, and a management control model. Process management defines the entire work stream for a business enterprise, including activities and service metrics. Work measurement provides a disciplined approach to setting expectations and includes reports that help drive all levels of management to manage these expectations. The management control model provides a disciplined approach to enable supervisors to plan, execute, follow-up, report, forecast, coach, and train in accordance with the current and future needs of the business enterprise. These business processes may be customized to meet the individual requirements of any business.

Figure 1:
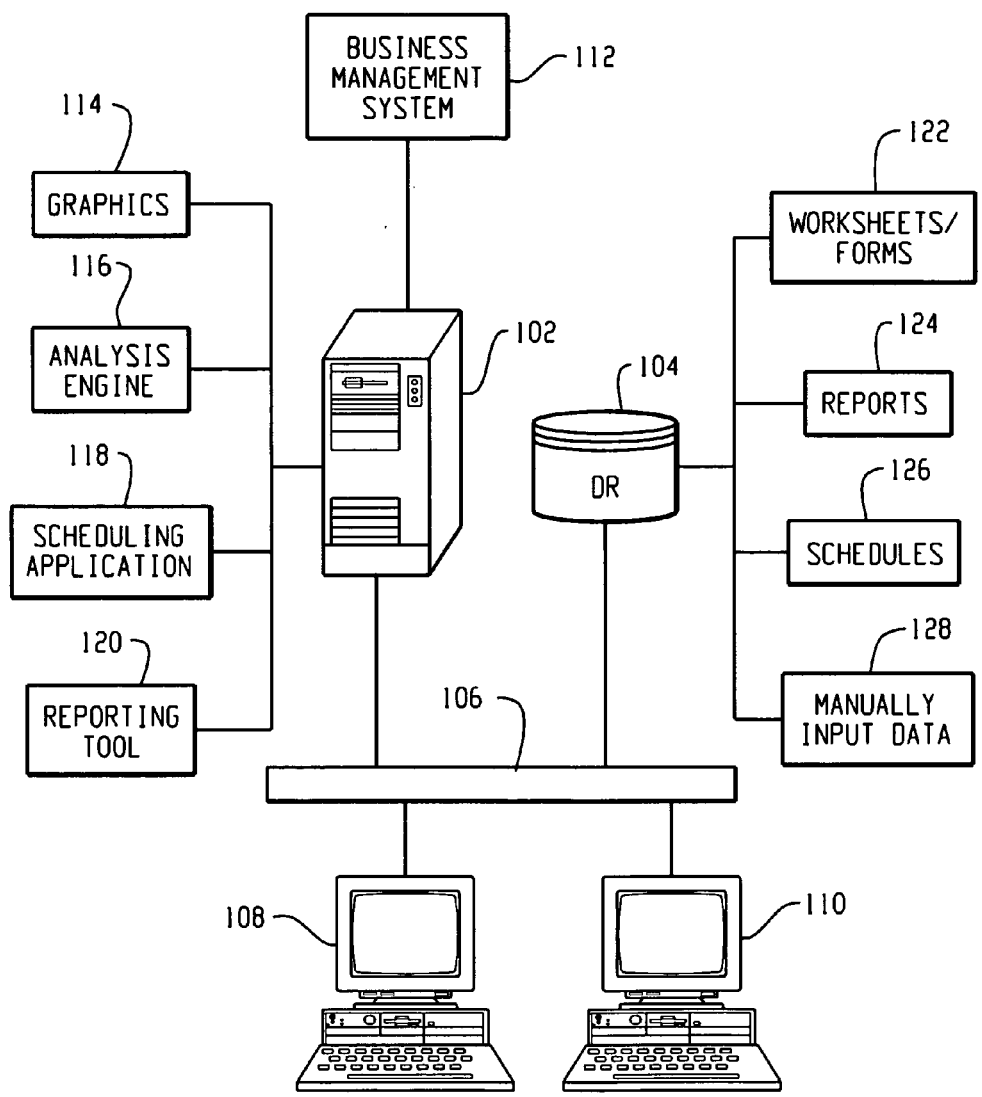
FIG. 1 is a block diagram of a system upon which the managing accelerated performance system may be implemented in exemplary embodiments.

The managing accelerated performance system may be implemented in a network system such as the one depicted in FIG. 1. FIG. 1 depicts a host system 102 executing the managing accelerated performance system 112. Host system 102 is in communication with a data storage 104 via a network 106. Alternatively, host system 102 and data storage 104 may comprise one unit, such as for example, a mainframe computer. Host system 102 is in communication with client systems 108 and 110 via network 106. Host system 102 executes various applications including a graphics application 114, an analysis engine 116, a scheduling application 118, and a reporting tool 120 as described further herein. Data storage 104 stores a variety of documents and data including worksheets 122, reports 124, schedules 126, and manually input data 128 which are created and/or utilized by the managing accelerated performance system.

Host system 102 may be a high-speed processor/server that executes applications 114-120 and services client systems 108 and 110. Data storage 104 is logically addressable by host system 102 and/or client systems 108 and 110 via network 106. Client systems 108 and 110 may each comprise a general-purpose desktop computer, laptop, or similar computer device. Client system 108 represents a computer device that is operated by a supervisor of an enterprise that utilizes the managing accelerated performance system. Client system 110 represents a computer device that is operated by a low-level employee of the business enterprise. Network 106 may comprise a local area network, wide area network, or other suitable networking infrastructure. Graphics application 114 may be an application such as a spreadsheet tool that provides charting and graphing capabilities. Analysis engine 116 may be a logic application that utilizes various algorithms to perform data analysis. Scheduling application 118 and reporting tool 120 may comprise any commercial or proprietary software that performs scheduling and reporting functions. These tools are widely known and will be readily understood by those skilled in the art.

Figure 2:
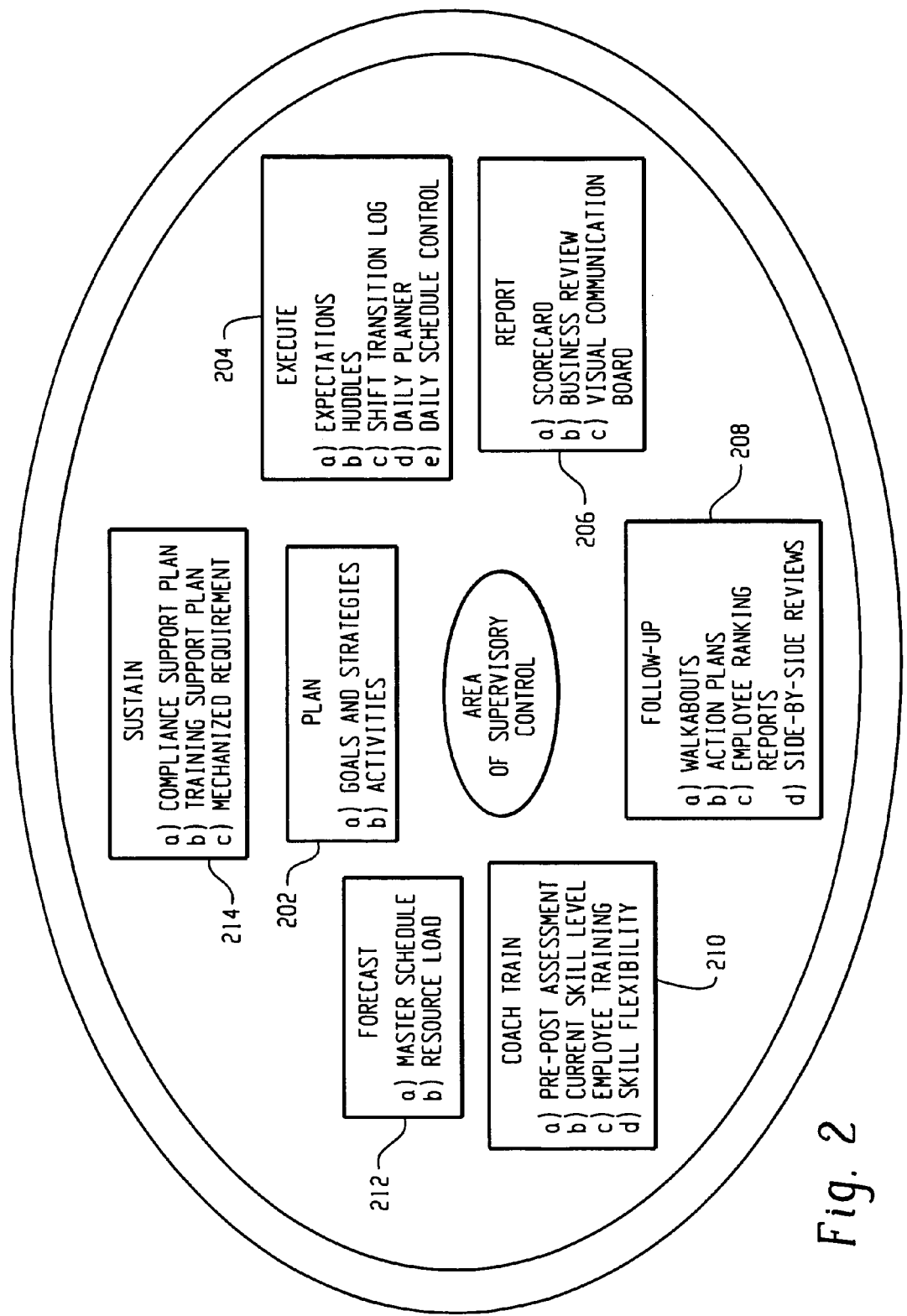
FIG. 2 is a diagram illustrating the components of the managing accelerated performance system model in exemplary embodiments.

An exemplary embodiment of the managing accelerated performance system model and its elements is shown in FIG. 2. The model 200 includes a disciplined seven-phase approach and each of the phases are discussed further in FIGS. 3-9. The observational data, analysis results, reports, and plans that pertain to a specific job role may be stored in a binder (also referred to herein as area book). This data, as well as data relating to all job functions are stored electronically in a database for easy access and retrieval.

The managing accelerated performance model 200 of FIG. 2 includes seven components or phases 202-214. Each of the phases, in turn, comprises one or more elements 202a-b, 204a-e, 206a-d, 208a-d, 210a-e, 212a-b, and 214a-c. The inner core of model 200 reflects the supervisory control over the entire seven-phase process, while the individual components reflect a higher level of process detail. The sustain phase 214, envelopes the model 200 to reflect that this phase is ongoing throughout the implementation of the model.

A plan phase 202 includes a goals and strategies element 202a and activities element 202b. The goals and strategies element 202a refers to the process of identifying opportunities, establishing goals for exploiting the opportunities, prioritizing the goals and strategies, and documenting the goals and strategies. This element ensures that effective communication of an opportunity is conducted and that the communication is directed to the appropriate individuals. The affected individuals may include personnel from a wide range of business and technical backgrounds. For example, relevant individuals may come from a high-level corporate office, and information technologist, operations staff, as well as a training department.

The activities element 202b refers to the mapping of processes using key volume indicators, identifying functional groups and activities assigned to these functional groups, and generating an activity list summary for each functional group. A sample activity list summary is shown in FIG. 10. An activity list summary is used to define work content for a particular work group and enables a supervisor to match resources with workload conditions. A supervisor reviews and approves the activity list summary and a copy is maintained in the appropriate area book. Details are specified for each activity in an activity detail summary that includes key volume indicators. Key volume indicators are used as forecasting tools and are produced by comparing like centers, work units, or functional groups and validating differences between processes used. Based upon volumes, engineering service measurements (ESMs), and reasonable established expectations, these key volume indicators are generated and used to develop a master schedule, resource load, and an activity list. An activity detail summary contains the work content for a work group and enables supervisors to understand each step involved in performing an activity on an activity list. An activity detail summary is developed for each activity listed in an activity list and is placed in an area book for the supervisor responsible for overseeing the activities.

Execute phase 204 includes an expectations element 204a, a huddles element 204b, a shift transition log element 204c, a daily planner element 204d, and a daily schedule control element 204e. A variety of documents may be used for tracking and reporting activities conducted through the managing accelerated performance model 200. For example, based upon the nature of activity defined for a supervisor, various technical aids may be acquired for assisting the supervisor in performing the activity. Generally the supervisor will be conducting observations of employee behaviors during this phase. Supervisors may be trained for conducting observations in terms of the specific types of behaviors that should be tracked.

Results from observations conducted are entered in managing accelerated performance system 112 and statistical analysis is performed on the results via analysis engine 116. From this analysis, expectations 204a are developed and communicated to the affected individuals. Expectations 204a refer to the established benchmarks set for an activity or best demonstrated practices (i.e., the optimum volume and quality of work conducted for each activity that assumes a fully trained employee, working at a constant rate with an average work mix, using the tools necessary to perform the activity, minus any lost time or operating problems encountered).

A daily load review refers to a tool that allows a supervisor to balance the workload for a work area by assessing the amount of work that needs to be done with the amount of labor needed to produce the work. While this description refers to a "daily load" for ease of explanation, it should be appreciated that the tool may be used for review for other time increments, e.g., weekly. The supervisor evaluates resource loads for each day to see how effective the workload planning was for the area. A daily planner 204d is used to document supervisory activities performed throughout the workday and daily huddles 204b are performed in order to establish daily expectations and synchronize information among individuals. The daily planner 204d is a tool designed to assist members of a department with daily prioritizing and short-term planning. It also helps a supervisor load tasks into his/her available work hours in order manage unexpected surges in work along with day-to-day activities. The daily huddle 204b refers to a management tool that allows a supervisor to understand and relay back any key developments that were noted from the previous day's work and to plan and prepare for the current day's operations. Specifically, the daily huddle 204b is a meeting that is conducted for an area in which employees review their performance from the previous day, share lessons learned, and point out any relevance to future operations (e.g., identifying roadblocks, expectations, and new assignments/reassignments). In exemplary embodiments, the daily huddles 204b are conducted at the beginning of a workday or shift.

As employees perform work activities, the results are collected in database 128 and processed to generate a daily tally sheet. The daily tally sheet provides detailed work data relating to performance and volumes for an activity. This information, in turn, is used to create a daily schedule control 204e. A sample daily schedule control 204e is shown in FIG. 11. The daily schedule control 204e is a structured follow-up tool that helps supervisors understand and relay off-schedule conditions. The daily schedule control 204e enforces a disciplined short-interval follow-up to any barriers that have been identified and any potential off-schedule conditions that have been detected. The daily schedule control 204e further provides a means for enabling a supervisor to compare actual work with planned work and helps to address issues early on before they become major problems. The daily schedule control 204e provides information including, but not limited to, percentage of productivity data, percentage of overtime data, earned hours, and lost time. The daily schedule control 204e is kept in the supervisor's area book for quick access and review. Capacity charts may be created by graphics application 114 using the information provided in the daily schedule control 204e. The shift transition log element 204c refers to a communication tool that allows management to follow up on issues that occur from one shift to the next so that they will not be overlooked as one supervisor's shift ends and another supervisor's shift begins. These are issues that have occurred during a shift and are believed to reoccur during the following shift.

A report phase 206 comprises a scorecard element 206a, a business review element 206b, and a visual communication board element 206c. These elements allow the supervisor of the managing accelerated performance system to conduct analysis of the data gathered in the above process, as well as communicate the results to the appropriate individuals. These individuals are then presented with an opportunity to provide feedback on the results. The results may be presented in a visual format such as graphical charts or other means.

Figure 12:
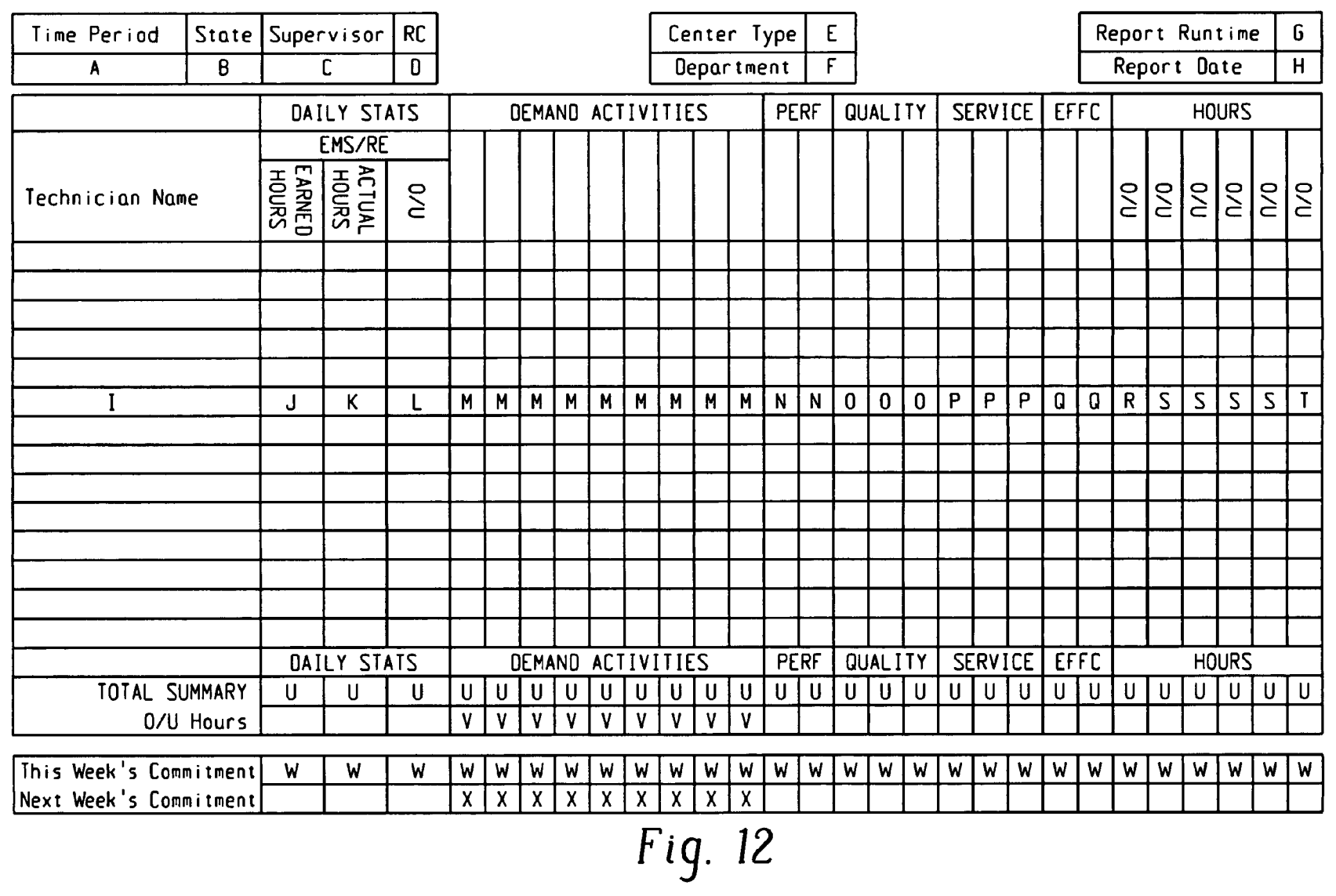

Scorecard element 206a refers to a performance and reporting tool that identifies trends in key measurement indicators on a daily and weekly basis. The scorecard element 206a summarizes information gained from the previous day's work, as well as for the week, and includes planned and actual items produced, hours worked, performance, effectiveness, service, quality, sustainability and the like. Action plans are developed using information in the scorecard. A sample scorecard is shown in FIG. 12. Information such as quality, service, effectiveness and the like may be collected by The business review element 206b refers to a meeting in which area managers present a variety of information elements to higher level entities such as corporate directors or company vice presidents. Information elements presented include, but are not limited to, the daily schedule controls 204e, an action plan 208b, a capacity graph, the scorecard element 206a. Areas managers that are successfully utilizing the managing accelerated performance system may be recognized, and any deficiencies relating to the utilization of the managing accelerated performance system for other area managers may be identified as needing improvement. In exemplary embodiments, the business review element 206b occurs on a monthly basis.

A key measurement indicator refers to a measurement tool that measures performance, service, quality, or effectiveness of work performed. Key measurement indicators quantify results into meaningful measurements. For example, in a customer service industry where performance is to be measured, key measurement indicators may be determined by assessing an activity that drives the functions for an area (e.g., a reasonable number of calls expected to be received at the work area). A base performance is determined for this function (e.g., a time period from which to begin subsequent measures is established). Then the actual value for the current period (e.g., week) is identified utilizing the key measurement indicator 'number of calls' and the base performance. The actual value is then compared with subsequent values (e.g., actual value information for the next week) to determine a percentage of change in performance from one time period to the next.

In an exemplary embodiment where quality is to be measured, key measurement indicators, or quality indicators, may be determined by assessing an activity that defines the quality of work in an area (e.g., the reasonable speed in which a customer call should be answered). A base performance is determined for this quality (e.g., a time period from which to begin subsequent measures is established). Then the actual value for the current period (e.g., week) is identified utilizing the key measurement indicator 'average speed' and the base performance. The actual value is then compared with subsequent values (e.g., actual value information for the next week) to determine a percentage of change in quality from one time period to the next.

In exemplary embodiments where service is to be measured, key measurement indicators may be determined by assessing an activity that defines the service performed in the work area (e.g., percentage of telephone calls answered within the average speed established above). A base for the service is determined (e.g., actual value information for the next week) to determine a percentage of change in service from one time period to the next. Likewise, in exemplary embodiments where effectiveness is to be measured, key measurement indicators may be determined by assessing an activity that defines the effectiveness within a work area (e.g., the number of repeat calls received on the same issue). A base for the effectiveness key measurement indicator is determined (e.g., actual value information for the next week) to determine a percentage of change in effectiveness from one time period to the next.

Visual communication board element 206c refers to a reporting tool that enables organization-wide views of current performance data. The visual communication board includes information from goals and strategies element 202a, action plans 208b, scorecards elements 206a, key measurement indicators, capacity charts, lost time data, and other sources to produce a quick reference for area performance. The visual communication board is preferably located in a central location within a supervisor's area that is visible to all employees in that area.

In the follow-up phase 208, a roadmap is developed for resolving any issues and for improving existing processes. The action plans 208b for removing barriers include detailed action items and metrics for guiding individuals through the roadmap. The action plans 208b include specific due dates for listed steps to be completed, and specifies the individuals responsible for the accomplishment of those steps. Feedback is also used in implementing a detailed action plan. A action plan 208b in accordance with exemplary embodiments is shown in FIG. 13. Also included in the follow-up phase 208 are walkabouts 208a, side-by-side reviews 208d, and employee ranking reports 208c. The employee ranking report 208c is used to rank employees based upon their initial screening (e.g., observations) in order to identify any specific training requirements needed. The information provided in the employee ranking report 208c details specific deficiencies that can be used to link a specific training program with the employee.

In the coach/train phase 210, employee training is scheduled and conducted 210c in order to improve the performance of individuals. During the coach/train phase 210 individuals are evaluated to determine their current skill levels 210b and skills flexibility 210d. A pre-post-training assessment element 210a is also conducted during the coach/train phase 210 as well. The pre-post training assessment element 210a is an evaluation tool that helps supervisors assess the skills training needs of each individual specific to one of three key skill areas: basic, fundamental, and advanced. Basic skill areas define the basic foundational elements needed to perform a job. Fundamental skill areas define an advanced set of skills desirable for optimally performing a job. Advanced skill areas define unique or special skills that may be required to perform a job, such as operating a special type of equipment or machine.

The pre-post training assessment element 210a serves two purposes: pre-assessment quickly calibrates an employee's skills prior to training, while post-assessment measures what an employee has retained after training. The skills flexibility element 210d identifies the skills and training a workgroup needs to effectively and efficiently complete assigned work. The skills flexibility element 210d identifies the relative strengths and weaknesses within a team from a training standpoint. Employees are ranked according to skill in order to determine the total number of qualified people available for performing jobs in an assigned department, which in turn, helps to identify any training needs. This information may be entered into graphics tool 114 in order to produce a visual picture of qualification statuses.

A forecast phase 212 uses operating reports (e.g., scorecard 206a) resulting from the execution of report phase 206 for resource planning. Operating capabilities and required resources are identified and used to plan and forecast future needs. Scorecards 206a and statistics are used in the forecast phase 212 to generate a resource load 212b, which determines, for example, day-to-day force to load requirements and a master schedule 212a that details a long-term force plan. Scheduling application 118 may be used to generate the master schedule 212a.

The sustain phase 214 ensures that all improvements accomplished via the processes above are sustained and continuously evaluated for currency. The compliance support plan 214a enables an area manager to review and measure a supervisor's understanding of, and commitment to, the elements of the managing accelerated performance system on three levels: conceptual, mechanical, and ownership. It also allows the area manager to identify any noncompliance and provide timely feedback to the respective supervisor in order to address and correct the issues. A mechanized requirement 214c and a training support plan 214b are included in the sustain phase 214 to further ensure sustainability of these processes. Information relating to these sustaining elements is documented and used throughout the managing accelerated performance system 200 to ensure ongoing and future success.

Figure 3:
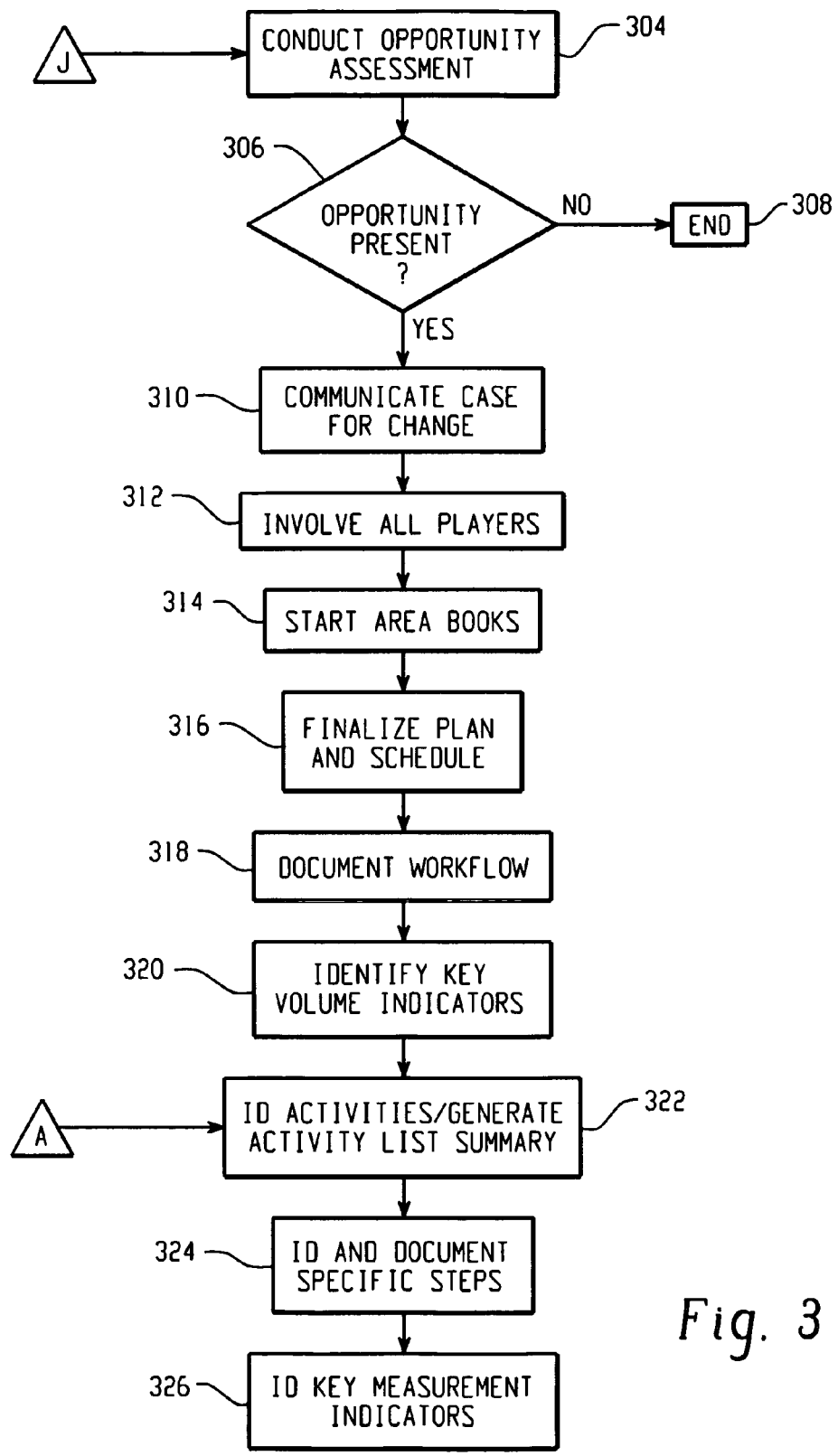
FIG. 3 is flowchart describing the plan phase of the managing accelerated performance system model in exemplary embodiments.

Embodiments of the managing accelerated performance system 200 include a seven-phase approach as described in FIGS. 3-8. FIG. 3 generally depicts the plan phase process. The plan phase process begins at step 304 where an opportunity assessment is conducted, the opportunity assessment can be preformed automatically by a machine or manually by a user. Based upon the results of the opportunity assessment, it is determined whether or not one or more opportunities are present at step 306. An opportunity may include, but is not limited to, a task, an activity, or a behavior that may be improved upon. If no opportunities are present at step 306, the process ends at step 308. If an opportunity is present at step 306, a supervisor of the managing accelerated performance system model communicates this opportunity and presents reasons for why the opportunity is relevant at step 310. At step 312, all individuals and/or departments that are affected by, or responsible for, this opportunity are involved. An area book, as described above in FIG. 2, may be generated for each individual involved with the opportunity. The area book can be used for documenting and storing information needed for implementing the model at step 314. At step 316, a plan and schedule are generated for exploiting the opportunity. Associated workflow processes are identified and documented at step 318. Key volume indicators are also identified at step 320. Activities needed for further developing the opportunity are identified at step 322. An activity list is generated for these activities. These activities may be identified through current business practices that are successful or otherwise desirable. They may also be obtained from the process conducted at step 404 in the execute phase of FIG. 4. Specific steps that need to be performed are adopted and documented at step 324. Any key measurement indicators are identified at step 326.

Figure 4:
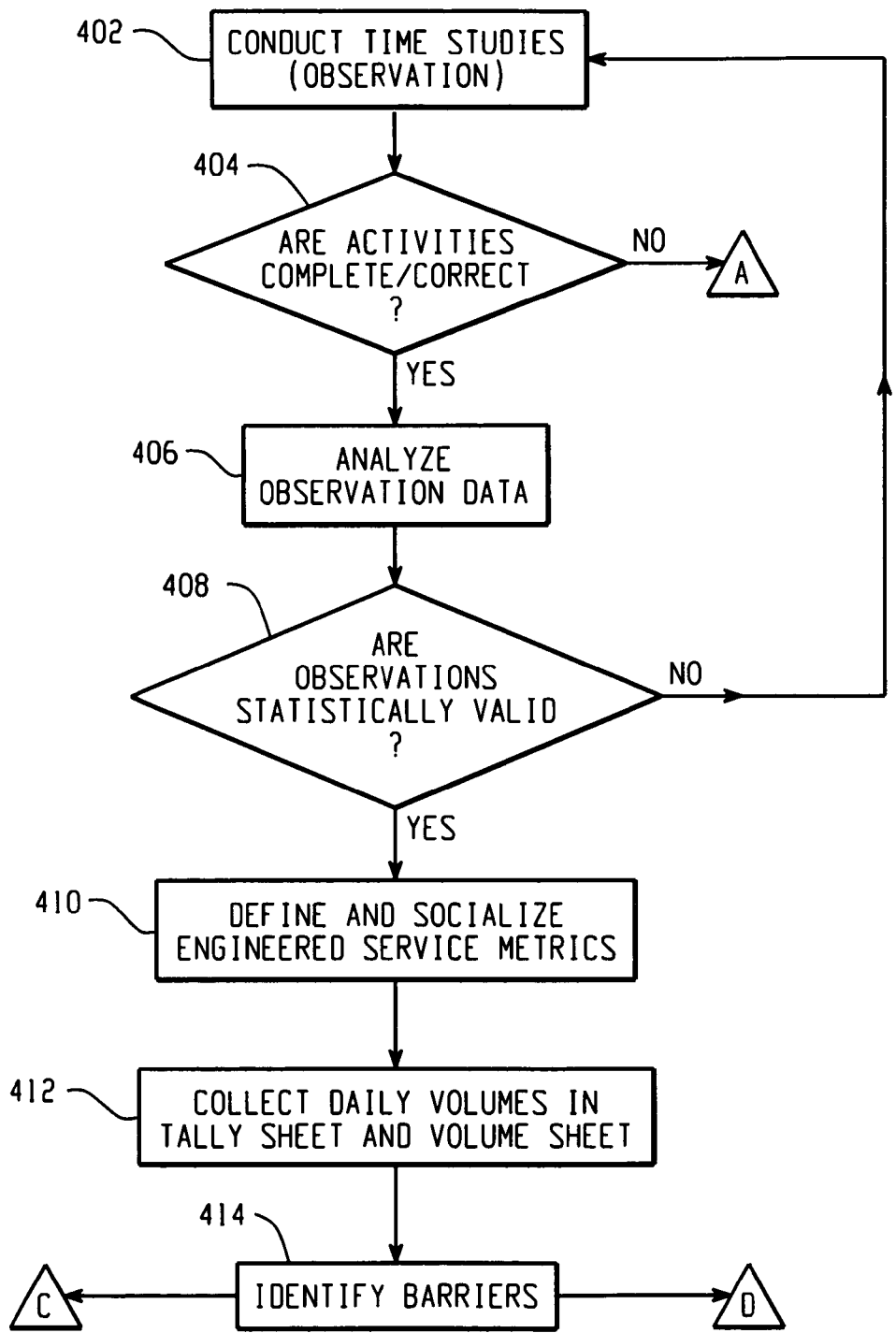
FIG. 4 is a flowchart describing the execute phase of the managing accelerated performance system model in exemplary embodiments.
Figure 5:
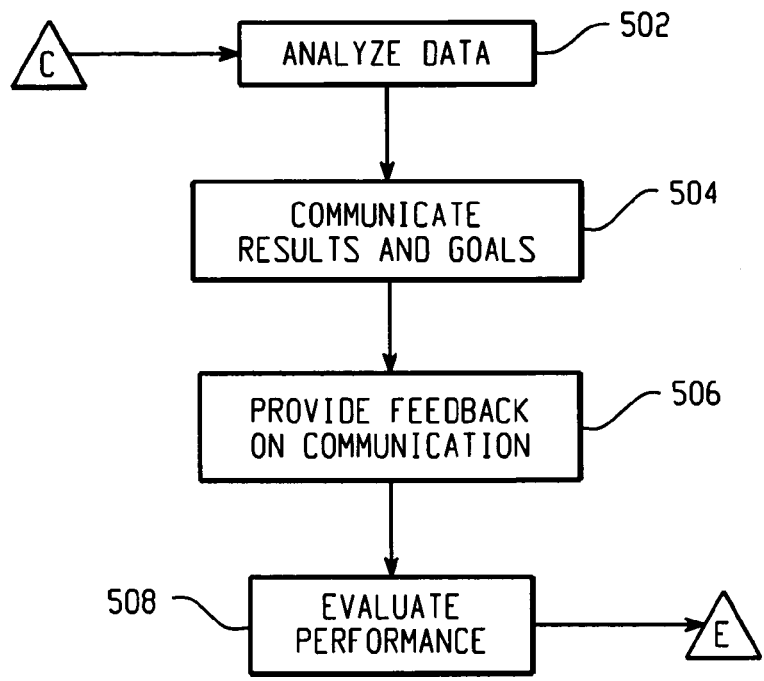
FIG. 5 is a flowchart describing the report phase of the managing accelerated performance system model in exemplary embodiments.
Figure 6:
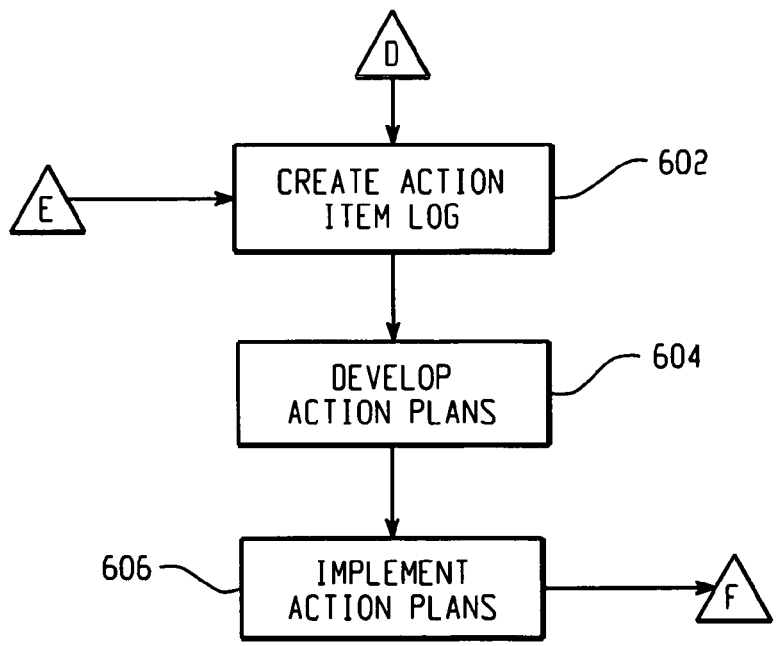
FIG. 6 is a flowchart describing the follow-up phase of the managing accelerated performance system model in exemplary embodiments.
Figure 7:
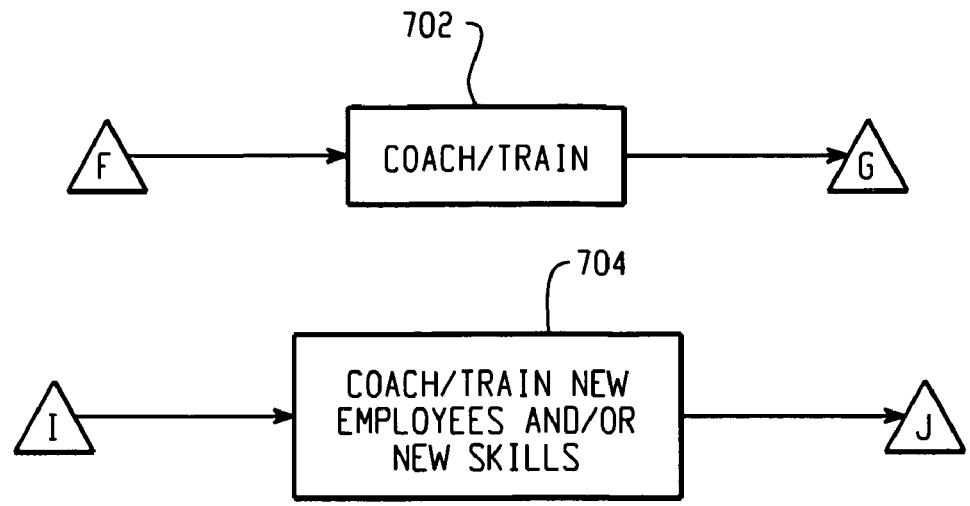
FIG. 7 is a flowchart describing the coach/train phase of the managing accelerated performance system model in exemplary embodiments.

Upon completion of the plan phase, the process proceeds to the execute phase which is illustrated in FIG. 4. At step 402, selected individuals conduct time studies. Based upon the studies, it is determined whether the activities specified in the plan phase are complete and correct at step 404. If not, the process returns to the plan phase at step 322 whereby the activities are revised accordingly. If the activities are complete and accurate at step 406, it is determined whether the observations (e.g., time studies) are statistically valid at step 408. If not, the process returns to step 402 where further time studies are conducted. Otherwise, the process proceeds to step 410 whereby engineered service metrics are defined. A tally sheet and volume sheet are utilized for collecting daily volumes at step 412. Any barriers or issues are identified at step 414. The barriers identified are used in both the reporting phase of FIG. 5 as well as the follow-up phase of FIG. 6 as described herein.

In the reporting phase, the data gathered from the above processes are analyzed at step 502. The analysis includes the issues identified in step 414 of FIG. 4. The results are communicated to involved individuals and/or departments at step 504. From this analysis, various goals are identifiable. These are communicated to the relevant individuals as well. At step 506, the individuals and/or departments are provided with an opportunity to relay feedback to the information presented at step 504. A performance evaluation is conducted at step 508 and the process continues to the follow-up phase of FIG. 6.

In one exemplary embodiment, the time studies may be implemented by conducting observer certification and qualifying various observers to conduct the time studies. Once the time studies are completed by the certified observers, the time study data is compiled and analyzed. The results of the analysis enable system managers to establish reasonable expectations (REs) quality indicator standards for each of the tasks observed. In this exemplary embodiment, the reasonable expectation quality indicator standard specifies a confidence value reflecting the accuracy of the standard based upon the analysis. For example, a RE standard may be set at 95% using the top 80% of the work drivers. Using 95% as the RE standard accounts for an error rate of 5%. Thus, the RE quality indicator standards may be physically verified (i.e., observed times to perform specific activities based upon the employee being fully trained and having normal skill, following approved methods and procedures, and working under normal conditions. These RE quality indicator standards may be used in a variety of business practices. For example, if the system of FIG. 1 represents a call center service provider, RE standards may be set to handle work force management issues to address adequate matching of incoming/outgoing call volume to a number of agents required to handle the calls, while meeting the required service level for the type of call. For example, a call center may have three service requirements, or goals: a service level goal that requires an operator to answer a minimum percentage of incoming call volumes within a defined amount of time. Another service requirement may include an average speed of answer goal that requires an average call queue time to be less than a threshold amount of time. Another service requirement may include a goal relating to abandoned calls, in which a goal is set that a maximum acceptable defines percentage of incoming calls are abandoned prior to being answered by a service provider. Two metrics that may influence the number of call agents required include "occupancy" and "average handle time" (AHT). Occupancy reflects the percent of time that agents handle calls to the wait time acceptable for the next incoming call. The AHT reflects the total average time for handling calls, including any after-call work. If management of the call center forecasts a particular incoming call volume, it may utilize the agents actual AHT and set an occupancy level value as the RE standard (e.g., the occupancy level set as high as needed while satisfying the agent's service level requirements).

At step 602, an action item log is created that includes the issues identified in step 414, as well as the results of the performance evaluation conducted at step 508. From the action item log, a detailed action plan is developed at step 604. With the action plan in place, the activities presented therein are then implemented at step 606 and the process continues to the coach/train phase of FIG. 7. At step 702, a supervisor or manager utilizes the specific items identified in the action plan to coach and/or train an employee. The process then continues to the forecast phase of FIG. 8. Additionally, the coach/train phase may be implemented as a result of activities conducted at step 912 of the sustain phase of FIG. 9. This may be the case where a business enterprise determines that new skills are needed.

Figure 8:
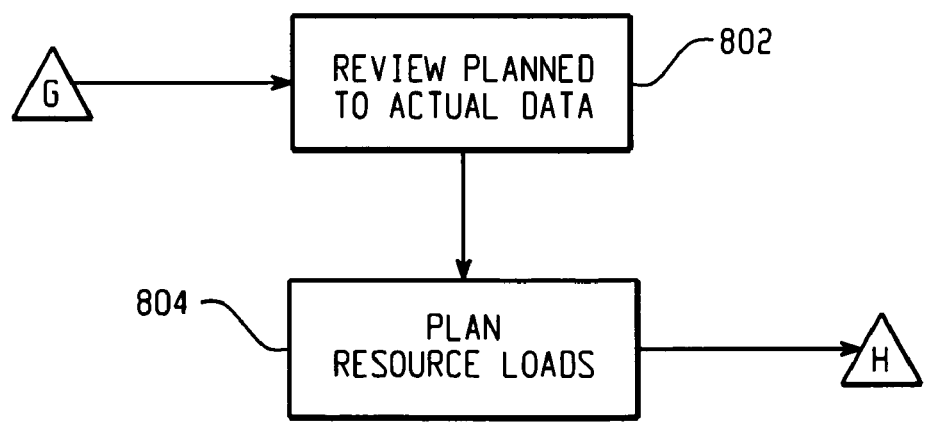
FIG. 8 is a flowchart describing the forecast phase of the managing accelerated performance system model in exemplary embodiments.
Figure 9:
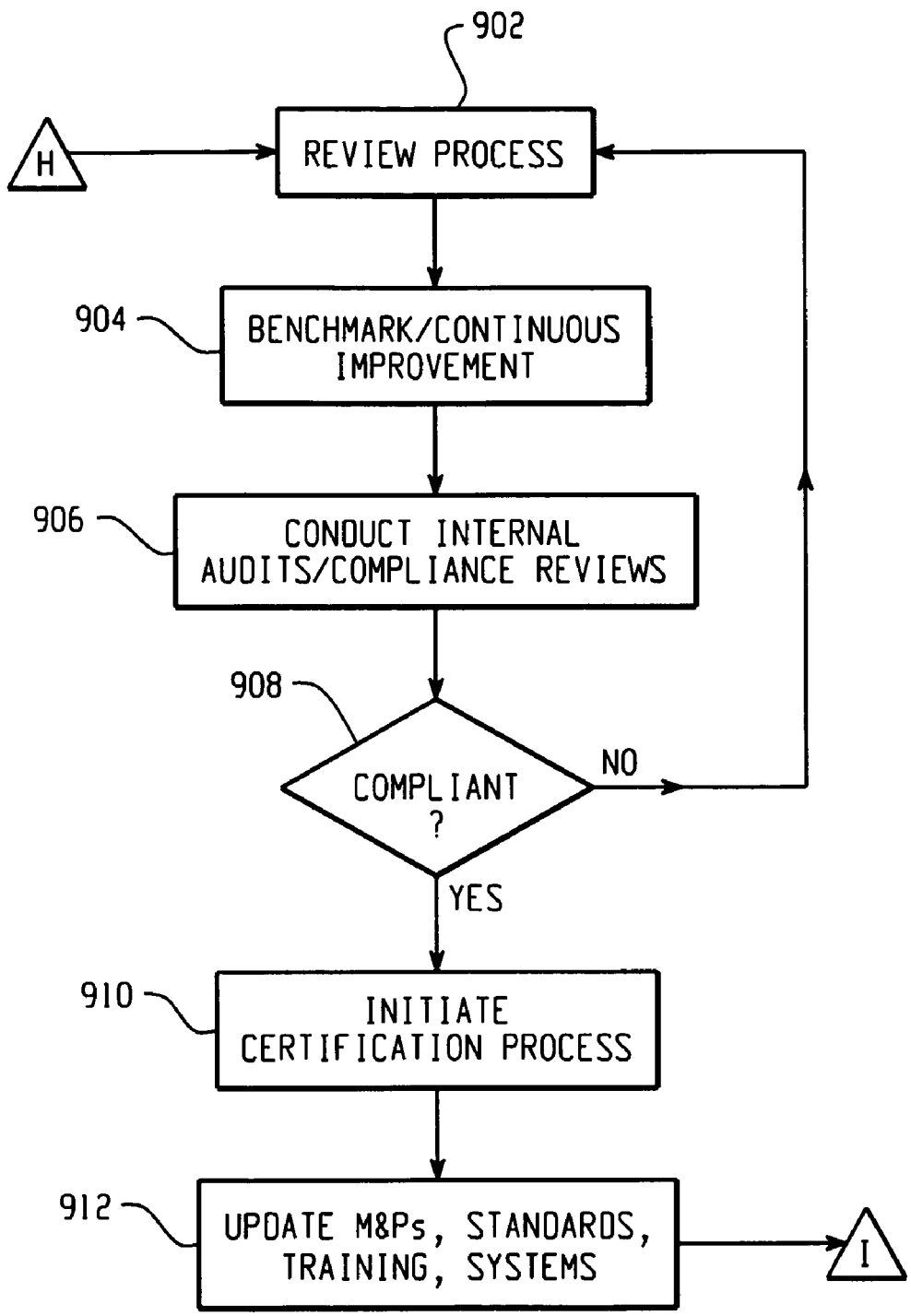
FIG. 9 is a flowchart describing the sustain phase of the managing accelerated performance system model in exemplary embodiments.

The forecast phase of FIG. 8 continues from the coach/train phase in which a review of the 'planned-to-actual' data is conducted at step 802. This data is acquired from step 702 and relates to the actual progress made by employees who have been coached in contrast to the planned progress for a given time period. At step 804 resource loads are planned based upon the review conducted at step 802. The process then continues to the sustain phase of FIG. 9.

At step 902, the process as developed to date is reviewed. The review includes identifying progress made as well as any deficiencies noted. Benchmarks for improvement and maintenance are developed at step 904. At step 906, internal audits and compliance reviews are conducted. If an audit reveals a non-compliance in a specific area at step 908, the process is once again reviewed at step 902 to identify the cause of non-compliance. Otherwise, a certification process is initiated to acknowledge the compliance at step 910. Any manuals, programs, standards, training, and/or systems benefiting from the compliance are updated at step 912. Additionally, step 912 may also include process change control, which is a standard method for introducing changes to existing processes and procedures. These activities may then be used to coach and train employees as described in FIG. 7 at step 704. These new activities or changes to existing activities may result from process improvement initiatives, action plan items, technology initiatives, new products or services, or the like.

As can be seen from the above descriptions the managing accelerated performance system provides a consistent model for supervisors and management personnel to manage a business utilizing productivity standards, process management, and management control systems. The managing accelerated performance system enables accomplishment of service metrics while substantially driving cost efficiencies. The methodology utilized by the managing accelerated performance system allows for efficient movement of personnel to new areas while building on past successes.

As described above, embodiments of the invention may include computer-implemented processes and apparatuses for practicing those processes. Embodiments may also include computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. Embodiments may further include computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims.

What is claimed is:

1. A method of providing a disciplined approach for conducting managing accelerated performance activities, the method comprising:
    developing an activity list of at least one of a task and a behavior that relate to an identified opportunity;
    performing a time study associated with the task and the behaviors that includes conducting observer certification, and qualifying a certified observer to conduct the time study;
    collecting time study data resulting from the time study;
    establishing a reasonable expectation quality indicator standard for each of the tasks based upon the collected time study data, the reasonable expectation quality indicator standard specifying a confidence value reflecting the accuracy of the standard;
    collecting performance data resulting from an actual performance of work activities, wherein the performance data is compared to a corresponding reasonable expectation quality indicator standard;
    identifying an issue presented as a result of analyzing the time study data and the performance data; and
    generating and implementing a roadmap for resolving the issue; and
    training an individual affected by the roadmap in accordance with an action item contained in the roadmap;
    wherein the collecting performance data resulting from actual performance of work activities comprises:
    generating a tally sheet of detailed work volume;
    creating a daily schedule control using the tally sheet, the daily schedule control comprising:
    productivity data;
    percentage of overtime data;
    earned hours; and
    lost time;
    wherein the method further comprises:
    using information in the activity list to develop an activity detail summary comprising:
    documenting a current workflow condition and requirement;
    identifying a key volume indicator;
    identifying an activity and creating an activity list summary; and
    identifying a key measurement indicator;
    wherein creating an activity list summary includes:
    mapping processes using the key volume indicator; and
    identifying functional groups and activities assigned to these functional groups;
    wherein an activity list summary is generated for each of the functional groups and defines work content for the corresponding functional group.

2. The method of claim 1, further comprising updating a database of roadmaps based upon notification of a compliance resulting from an activity assessment.

3. The method of claim 1, wherein the developing the activity list includes:
    establishing a goal and a strategy for exploiting the identified opportunity;
    documenting the goal and the strategy; and
    communicating the goal and the strategy to the individual affected.

4. The method of claim 1, further comprising
    creating a shift transition log identifying issues that occur from one shift and recur on another shift.

5. The method of claim 1, wherein the key volume indicators are derived by:
    comparing two or more similar work units and validating differences between processes used in the similar work units; and
    establishing engineering service metrics and reasonable expectations resulting from the comparing the similar work units, wherein the engineering service metrics include a best demonstrated practice for activities conducted in the work units.

6. The method of claim 1, wherein the key measurement indicators measure performance, service, quality, and effectiveness of work performed and quantify results into relevant measurements.

7. The method of claim 1, wherein the reasonable expectation quality indicator standard is an occupancy value that identifies a percentage of time that a call agent handles a call to a defined acceptable wait time for answering the next incoming call, and the reasonable expectation quality indicator standard accounting for a service level goal that specifies a minimum percentage of incoming calls to be answered by the call agent within a defined amount of time.

8. A storage medium encoded with machine-readable computer program code for providing a disciplined approach for conducting managing accelerated performance activities, the storage medium including instructions for causing a server to implement a method, comprising:
    developing an activity list of at least one of a task and a behavior that relate to an identified opportunity;
    performing a time study associated with the task and the behaviors that includes conducting observer certification, and qualifying a certified observer to conduct the time study;
    collecting time study data resulting from the time study;
    establishing a reasonable expectation quality indicator standard for each of the tasks based upon the collected time study data, the reasonable expectation quality indicator standard specifying a confidence value reflecting the accuracy of the standard;
    collecting performance data resulting from an actual performance of work activities, wherein the performance data is compared to a corresponding reasonable expectation quality indicator standard;
    identifying an issue presented as a result of analyzing the time study data and the performance data;
    generating and implementing a roadmap for resolving the issue; and training a individual affected by the roadmap in accordance with an action item contained in the roadmap;
wherein the collecting performance data resulting from actual performance of work activities comprises:
generating a tally sheet of detailed work volume;
creating a daily schedule control using the tally sheet, the daily schedule control comprising:
productivity data;
percentage of overtime data;
earned hours; and
lost time;
wherein the method further comprises:
using information in the activity list to develop an activity detail summary comprising:
documenting a current workflow condition and requirement;
identifying a key volume indicator;
identifying an activity and creating an activity list summary; and
identifying a key measurement indicator;
wherein creating an activity list summary includes:
mapping processes using the key volume indicator; and
identifying functional groups and activities assigned to these functional groups;
wherein an activity list summary is generated for each of the functional groups and defines work content for the corresponding functional group.

9. The storage medium of claim 8, further comprising instructions for causing the server to implement:
updating a database of roadmaps based upon notification of a compliance resulting from an activity assessment.

10. The storage medium of claim 8, wherein the developing an activity list includes:
establishing a goal and a strategy for exploiting the identified opportunity;
documenting the goal and the strategy; and
communicating the goal and the strategy to the individual affected.

11. The storage medium of claim 10, further comprising instructions for causing the server to implement:
creating a shift transition log identifying issues that occur from one shift and recur on another shift.

12. The storage medium of claim 8, wherein the key volume indicators are derived by:
comparing two or more similar work units and validating differences between processes used in the similar work units; and
establishing engineering service metrics and reasonable expectations resulting from the comparing the similar work units, wherein the engineering service metrics include a best demonstrated practice for activities conducted in the work units.

13. The storage medium of claim 8, wherein the key measurement indicators measure performance, service, quality, and effectiveness of work performed and quantify results into relevant measurements.

14. The storage medium of claim 8, wherein reasonable expectation quality indicator standard is an occupancy value that identifies a percentage of time that a call agent handles a call to a defined acceptable wait time for answering the next incoming call, and the reasonable expectation quality indicator standard accounting for a service level goal that specifies a minimum percentage of incoming calls to be answered by the call agent within a defined amount of time.

15. A system for providing a disciplined approach for conducting managing accelerated performance activities, comprising:
a server;
a managing accelerated performance system executing on the server,
wherein the managing accelerated performance system performs:
developing an activity list of at least one of a task and a behavior that relate to an identified opportunity;
performing a time study associated with the task and the behaviors that includes conducting observer certification, and qualifying a certified observer to conduct the time study;
collecting time study data resulting from the time study;
establishing a reasonable expectation quality indicator standard for each of the tasks based upon the collected time study data, the reasonable expectation quality indicator standard specifying a confidence value reflecting the accuracy of the standard;
collecting performance data resulting from an actual performance of work activities, wherein the performance data is compared to a corresponding reasonable expectation quality indicator standard;
identifying an issue presented as a result of analyzing the time study data and the performance data;
generating and implementing a roadmap for resolving the issue; and
training a individual affected by the roadmap in accordance with an action item contained in the roadmap;
wherein the collecting performance data resulting from actual performance of work activities comprises:
generating a tally sheet of detailed work volume;
creating a daily schedule control using the tally sheet, the daily schedule control comprising:
productivity data;
percentage of overtime data;
earned hours; and
lost time;
wherein the managing accelerated performance system performs using information in the activity list to develop an activity detail summary comprising:
documenting a current workflow condition and requirement;
identifying a key volume indicator;
identifying an activity and creating an activity list summary; and
identifying a key measurement indicator;
wherein creating an activity list summary includes:
mapping processes using the key volume indicator; and
identifying functional groups and activities assigned to these functional groups;
wherein an activity list summary is generated for each of the functional groups and defines work content for the corresponding functional group.

16. The system of claim 15, wherein the managing accelerated performance system performs further performs:
updating a database of roadmaps based upon notification of a compliance resulting from an activity assessment.

17. The system of claim 15, wherein the developing an activity list includes:
establishing a goal and a strategy for exploiting the identified opportunity;
documenting the goal and the strategy; and
communicating the goal and the strategy to the individual affected.

18. The system of claim 17, wherein the managing accelerated performance system further performs:
creating a shift transition log identifying issues that occur from one shift and recur on another shift.

* * * * *